(No Model.) 2 Sheets—Sheet 1.

P. F. DEARSTYNE.
TOBACCO CUTTING MACHINE.

No. 360,797. Patented Apr. 5, 1887.

Witnesses:
S. B. Brewer
C. H. Hamlin

Inventor:
P. F. DEARSTYNE,
by William N. Low,
Attorney.

(No Model.) 2 Sheets—Sheet 2.
P. F. DEARSTYNE.
TOBACCO CUTTING MACHINE.

No. 360,797. Patented Apr. 5, 1887.

Witnesses:
S. B. Brewer.
C. A. Hamlin.

Inventor:
P. F. DEARSTYNE,
by
William N. Low,
Attorney.

UNITED STATES PATENT OFFICE.

PETER F. DEARSTYNE, OF ONEONTA, ASSIGNOR OF ONE-THIRD TO JOHN G. ZIMMERMANN, JR., OF WEST TROY, NEW YORK.

TOBACCO-CUTTING MACHINE.

SPECIFICATION forming part of Letters Patent No. 360,797, dated April 5, 1887.

Application filed April 7, 1886. Serial No. 198,115. (No model.)

*To all whom it may concern:*

Be it known that I, PETER F. DEARSTYNE, of Oneonta, in the county of Otsego and State of New York, have invented new and useful Improvements in Tobacco-Cutting Machines, of which the following is a specification.

My invention relates to a machine for cutting scrap-tobacco for making fillings for cigars.

The object of my invention is to provide a machine that will properly cut scrap-tobacco into suitable pieces for the fillings of cigars and automatically separate said fillings from the other products of the tobacco. This object I attain by means of the mechanism illustrated in the accompanying drawings, which, being herein referred to, form part of this specification, and in which—

Figure 1:
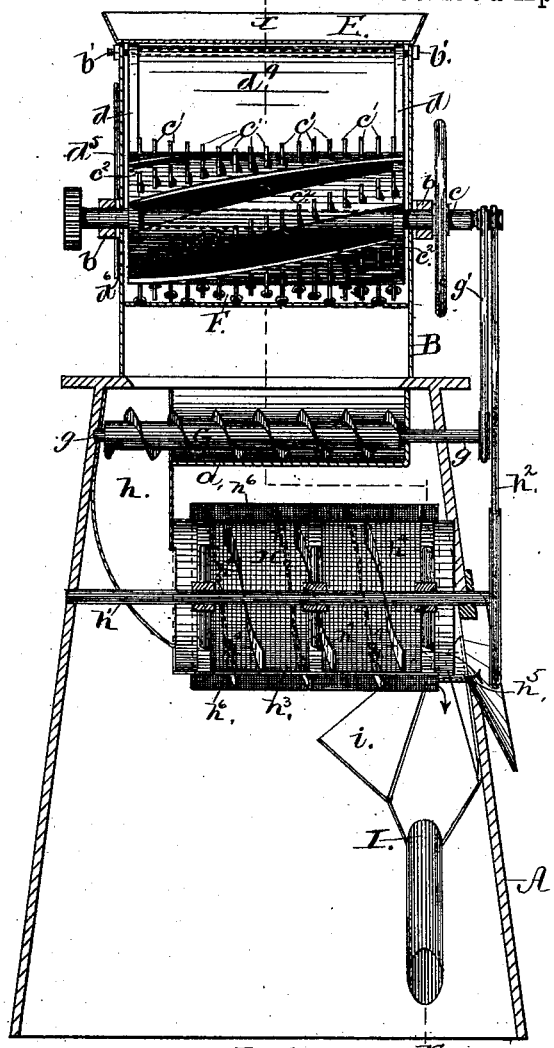
Figure 2:
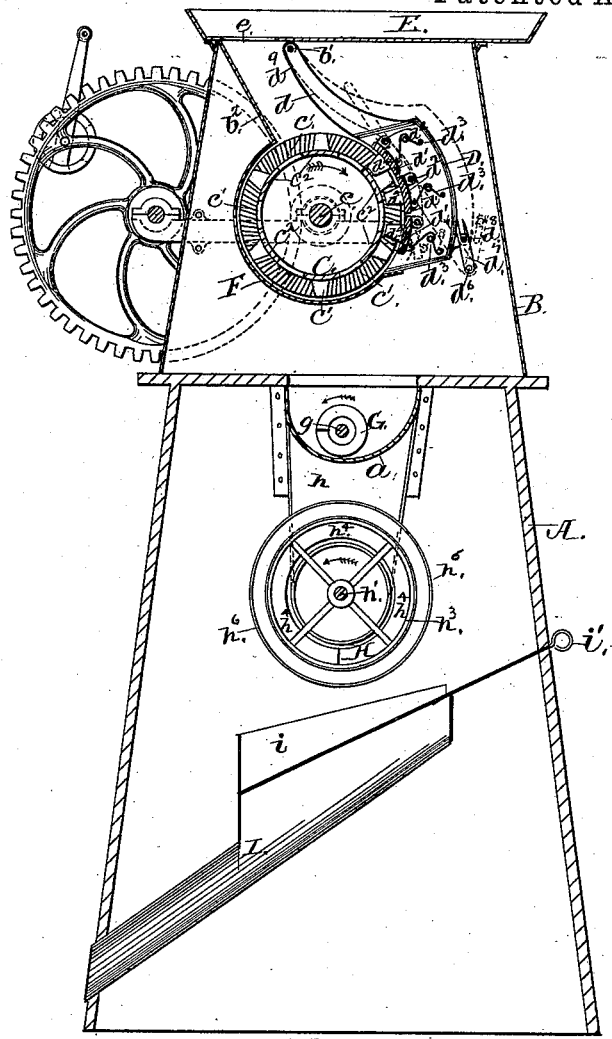
Figure 3:
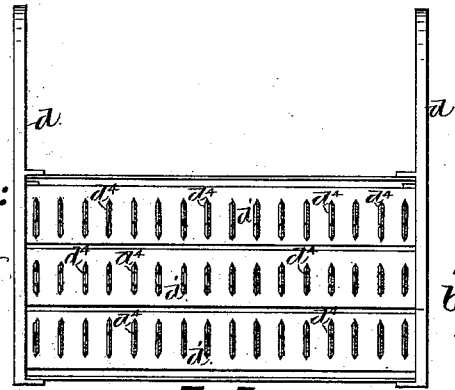

Figure 1 is a longitudinal section of my machine, with the cutter-cylinder, upper conveyer, and dust-spout shown in elevation; Fig. 2, a transverse section of the same at the line X X, and Fig. 3 an enlarged and detached front elevation of the stationary cutter-block.

As represented in the drawings, A is the base-piece of the machine, made in the form of a box and surmounted by the casing B for the cutting apparatus.

C is the revolving cutting-cylinder, which is fixed on a shaft, $c$, that revolves in the bearings $b$. Said cylinder is composed of a series of diagonally-arranged staves, $c^2$, and adapted to revolve in the direction indicated by an arrow marked thereon in Fig. 2. Said cylinder is provided with a series of projecting narrow knives, $c'$, which are arranged in spiral rows, as shown in Fig. 1.

D is a stationary cutter-holder, which remains in a fixed position while the machine is operating, but which is hung by its arms $d$ to the cross-rod $b'$, so as to swing back, as shown by the dotted lines on Fig. 2. Said cutter-holder is recessed on its side next the cutter-cylinder C, and is provided with a series of knife-blocks, $d'$, which are pivoted, as at $d^2$, to the holder D, and which are held in position to perform their work by springs $d^3$, which press against the backs of said blocks. Each of the blocks $d'$ is provided with a series of projecting knives, $d^4$, which are fixed on a straight line and are spaced so as to come intermediately with the knives $c'$ of the cutting-cylinder, with which they co-operate to reduce the tobacco to pieces of the required size. By pivoting the blocks $d'$ to the holder D, provision is made against injury to the knives $c'$ and $d^4$ from nails, stones, or other hard foreign substances which are liable to be put into the machine. When such accidents do occur, the knife-blocks $d'$ will be automatically swung back on their pivots $d^2$ against the resistance of the springs $d^3$ until the obstructing matter has been carried past the knives $d^4$; and as soon as any row of the knives $d^4$ is freed from such obstruction its block $d'$ will be instantly forced forward to its normal position by its spring $d^3$. An arm, $d^5$, placed outside of the casing, is secured to a cross-shaft, $d^6$, which carries a slotted arm, $d^7$, and the latter engages with a cross-bar, $d^8$, fixed to the cutter-holder D, so that by moving the arm $d^5$ the holder D can be swung back, as indicated by dotted lines in Fig. 2, to move the knives $d^4$ clear from the knives $c'$ on the cutting-cylinder. An apron, $d^9$, is fixed to the rod $b'$ and forms, with the partition $b^2$ of casing B, a chute, through which the tobacco (which is fed into the machine through the opening $e$ of the hopper E) is conducted directly to the cutting-cylinder C.

F is a semi-cylindrical perforated apron, which passes around the front and lower part of the cutting-cylinder C, just free from the knives $c'$. The perforations in said apron are sufficiently large to permit proper-sized pieces of tobacco to pass through them; but the apron prevents the larger pieces from passing out, and they, being caught by the knives $c'$, are returned by the latter to be acted on by the knives $d^4$ until reduced to the proper size.

G is the upper conveyer, fixed to the shaft $g$ and arranged to rotate in the trough $a$, formed in the upper end of the base-piece A. Said trough is located directly under the perforated apron F, so that all the pieces and dust produced by cutting the tobacco will fall directly into said trough. The conveyer G is rotated by the band $g'$ from the shaft $c$, and by the action of its spiral flange the tobacco and dust is pushed along the trough $a$ until it falls into the chute $h$, and from thence passes into the revolving screen H. The latter is fixed on a shaft, $h'$, which derives its motion, through the band $h^2$, from the shaft $c$. The revolving screen H is composed of two concentric cylindrical sieves, the inner sieve, $h^3$, being of a coarse mesh that will let all dust and refuse pass through, but will prevent the pieces of tobacco from doing so. A spiral wing, $h^4$, fixed in the interior of the inner sieve, $h^3$, forces the pieces of tobacco toward the outer end of said screen, from whence they fall out onto the apron $h^5$, and from thence into a suitable receptacle placed there to receive them. The outer cylindrical sieve, $h^6$, of a finer mesh, is fixed to the inner one, so as to leave between them an annular space that is open at the outer end, and in said annular space a spiral rib, $h^7$, is placed, to force the coarse dust out at the open outer end. Both sieves revolve together. The fine mesh of the outer sieve, $h^6$, permits the very fine tobacco-dust to sift through it, while the coarser particles are carried to the opening at the outer end, as indicated by the lower arrow in Fig. 1, and are discharged into the dust-spout I, through which they are carried and discharged outside of the machine. A cover, $i$, is hinged to the inner end of said dust-spout, and a handle, $i'$, connected to said cover, extends through the side of the base-piece, so as to afford the means for exteriorly moving said cover to open and close the inner part of the dust-spout I. When the cover $i$ is shut down, all the dust, both coarse and fine, will be collected inside of the base-piece A, from which it can be removed through a suitable door formed in said base-piece.

I claim as my invention—

1. The combination, with a rotative cylinder provided with projecting knives, of a cutter-holder pivoted to the casing of the machine, but normally held in a stationary position, the said cutter-holder being provided with projecting knives fixed in blocks that are pivoted to said holder and forced forward by springs, whereby said blocks are adapted to have a movement independent of said holder, the knives in said blocks being arranged to coact with the knives on the rotative cylinder, as and for the purpose specified.

2. The revolving screen H, composed of two cylindrical sieves, the inner sieve, $h^3$, being made of a coarse mesh and having a spiral rib, $h^4$, fixed to its inner surface, and the outer sieve, $h^6$, being made of a finer mesh, as and for the purpose herein specified.

PETER F. DEARSTYNE.

Witnesses:
WM. H. LOW,
S. B. BREWER.